United States Patent
Morisetti et al.

(10) Patent No.: US 8,880,789 B2
(45) Date of Patent: Nov. 4, 2014

(54) OPTIMAL POWER USAGE IN DECODING A CONTENT STREAM STORED IN A SECONDARY STORAGE

(75) Inventors: Chandrasekhar Morisetti, Hyderabad (IN); Susmitha V P N D Gummalla, Nuzvid (IN); Murali Mohan Kakarla, Hyderabad (IN); Jim Van Welzen, Raleigh, NC (US)

(73) Assignee: Nvidia Corporation, Santa Clara, CA (US)

( * ) Notice: Subject to any disclaimer, the term of this patent is extended or adjusted under 35 U.S.C. 154(b) by 519 days.

(21) Appl. No.: 12/331,453

(22) Filed: Dec. 10, 2008

(65) Prior Publication Data

US 2010/0146198 A1    Jun. 10, 2010

(51) Int. Cl.
```
G06F 12/00      (2006.01)
H04N 19/423     (2014.01)
H04N 19/436     (2014.01)
H04N 19/156     (2014.01)
H04N 19/127     (2014.01)
H04N 19/172     (2014.01)
H04N 19/44      (2014.01)
```

(52) U.S. Cl.
CPC ... *H04N 19/00484* (2013.01); *H04N 19/00521* (2013.01); *H04N 19/00206* (2013.01); *H04N 19/00103* (2013.01); *H04N 19/00266* (2013.01); *H04N 19/00533* (2013.01)
USPC .................................. 711/104; 711/E12.001

(58) Field of Classification Search
USPC .......................................... 711/104, E12.001
See application file for complete search history.

(56) References Cited

U.S. PATENT DOCUMENTS

| | | | |
|---|---|---|---|
| 6,028,631 A | 2/2000 | Nakaya et al. | |
| 7,852,940 B2 | 12/2010 | Malayath | |
| 8,094,552 B1 * | 1/2012 | Sachidanandam | 370/230 |
| 2003/0154185 A1 * | 8/2003 | Suzuki et al. | 707/1 |
| 2004/0136596 A1 | 7/2004 | Oneda et al. | |
| 2004/0184541 A1 | 9/2004 | Brockmeyer et al. | |
| 2006/0171454 A1 | 8/2006 | Jung | |
| 2006/0174303 A1 | 8/2006 | Yoshimoto et al. | |
| 2007/0274245 A1 | 11/2007 | Balatsos et al. | |
| 2008/0112484 A1 | 5/2008 | Shih et al. | |
| 2008/0144949 A1 | 6/2008 | Inoue | |
| 2008/0186392 A1 * | 8/2008 | Matsuyama | 348/294 |

FOREIGN PATENT DOCUMENTS

| | | |
|---|---|---|
| JP | 10-248063 | 9/1998 |
| JP | 11-136682 | 5/1999 |
| JP | 2000-253587 | 9/2000 |
| JP | 2001-186469 | 7/2001 |
| JP | 2003-199002 | 7/2003 |
| JP | 2008-160358 | 7/2008 |
| TW | 200840366 | 10/2008 |
| WO | 2008045633 | 4/2008 |

* cited by examiner

*Primary Examiner* — Jasmine Song

(57) ABSTRACT

Decoding a content of interest with optimal power usage. In an embodiment, a central processing unit (CPU) retrieves the frames of a data stream of interest from a secondary storage and stores them in a random access memory (RAM). The CPU forms an index table indicating the locations at which each of the frames is stored. The index table is provided to a decoder, which processes the frames in sequence to recover the original data from the encoded data. By using the index information, the power usage is reduced at least in an embodiment when the decoding is performed by an auxiliary processor.

20 Claims, 5 Drawing Sheets

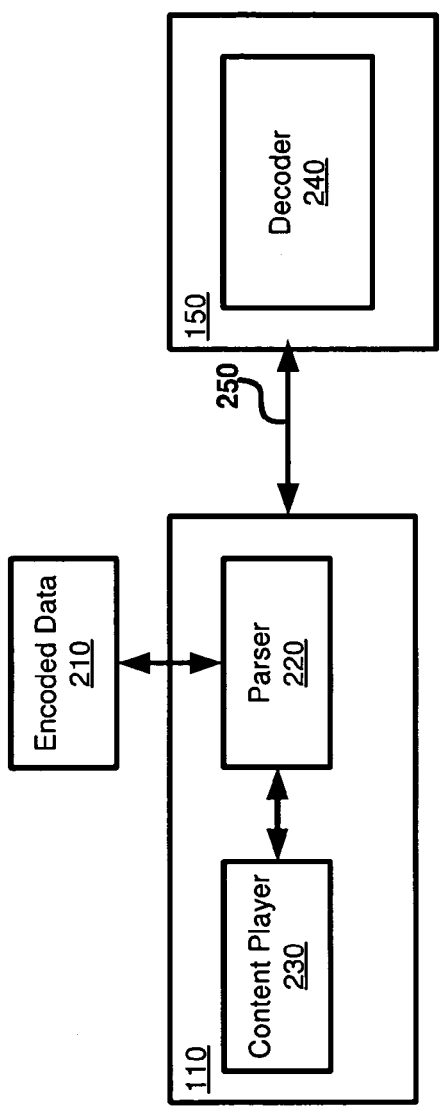
*FIG. 2A*
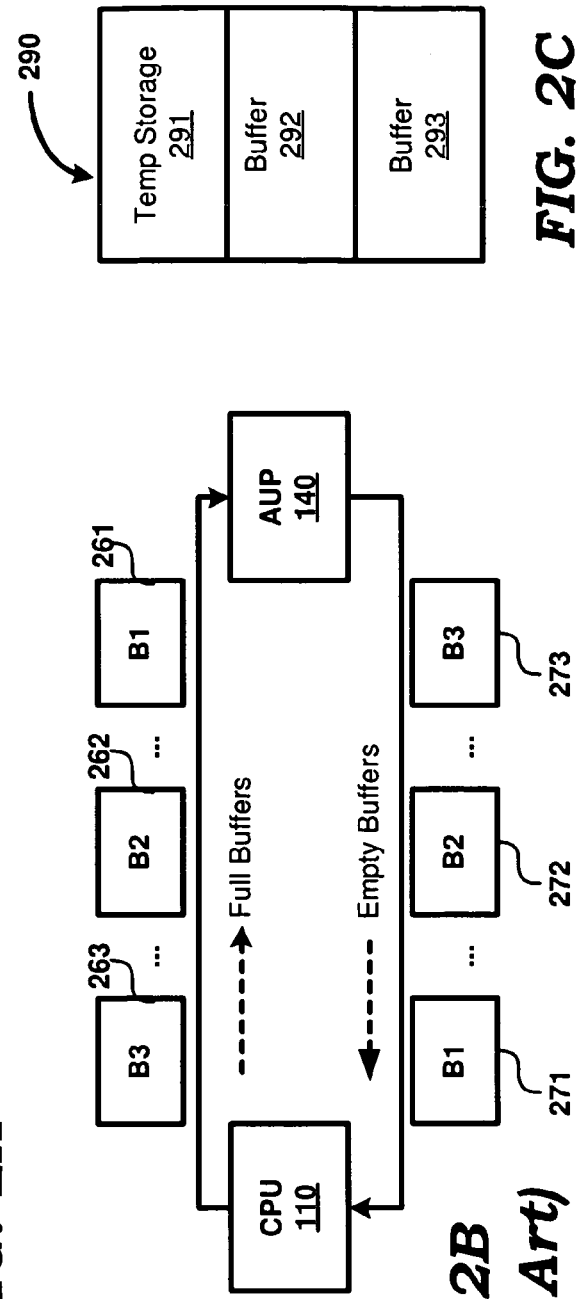
*FIG. 2C*
*FIG. 2B*
*(Prior Art)*

| S1 | S2 | S5 | S4 | S3 |
|----|----|----|----|----|
| OF1 | OF2 | OF5 | OF4 | OF3 |
| F1 | F2 | F3 | F4 | F5 |

*FIG. 7*

OPTIMAL POWER USAGE IN DECODING A CONTENT STREAM STORED IN A SECONDARY STORAGE

BACKGROUND

1. Technical Field

The present disclosure relates to decoding systems and more specifically to optimal usage of power in decoding content streams stored in a secondary storage.

2. Related Art

A content stream contains one or more data streams (a sequence of data units), together representing a desired content. For example, a movie (content) may be represented in the form of multiple streams, with one stream representing successive video frames, another stream representing an audio stream in English and yet another stream representing text or an audio stream in Spanish, etc.

Content streams often need to be decoded. As is well known, decoding generally is the inverse of encoding. In general, a desired/original content in original form is encoded according to an encoding approach to generate encoded content. Encoding is performed typically for reasons such as representing the content in compressed format, for security, etc. The encoded content is then processed based on a decoding approach (which in turn corresponds to the encoding approach used) to recover the content as close as possible to the original content.

Encoded content may be stored in a secondary storage prior to decoding. Secondary storage refers to any non-volatile storage, e.g., a hard disk, a CD-ROM, a pen-drive, etc. Secondary storage can be used for reasons such as merely storing the content for repeated use of the content, for transporting the content to different devices, etc.

Power is consumed when decoding data streams stored on secondary storages. Power may be consumed in operations such as operating the drive electronics that retrieve the data units from the secondary storage, the processor that performs the decoding operation and random access memory (RAM) used by the processor.

It is generally desirable that power be consumed optimally, especially when devices operate from stored battery power. For example, many of the portable devices operate from batteries (provided internal to the devices), and it is generally desirable that power be optimally used when the content is being decoded (e.g., when a movie is played).

BRIEF DESCRIPTION OF THE DRAWINGS

Example embodiments of the present invention will be described with reference to the accompanying drawings briefly described below.

FIG. 2A is a block diagram illustrating the manner in which content streams are processed in an embodiment.

FIG. 2B is a diagram illustrating the manner in which a data stream is decoded in a prior approach.

FIG. 2C is a diagram illustrating the use of different portions of a memory for different purposes while decoding a content stream.

FIG. 7 is a table illustrating the manner in which index information is represented in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention provides for decoding of a content of interest with optimal power usage. In an embodiment, a central processing unit (CPU) retrieves the frames of a data stream of interest from a secondary storage and stores them in a random access memory (RAM). The CPU forms an index table indicating the locations at which each of the frames is stored. The index table is provided to an auxiliary processor, which decodes the frames to recover the original data from the encoded data.

The number of accesses to the secondary storage may be reduced since the content of interest can be retrieved and stored in the RAM and processed for any of the data streams contained in the content stream. The location information (within the RAM) for several frames may be provided to the decoder in a single transaction (e.g., by a corresponding interrupt), thereby allowing the CPU to be turned off for a longer duration. Power consumption may be reduced as a result.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example System/Device

Figure 1:
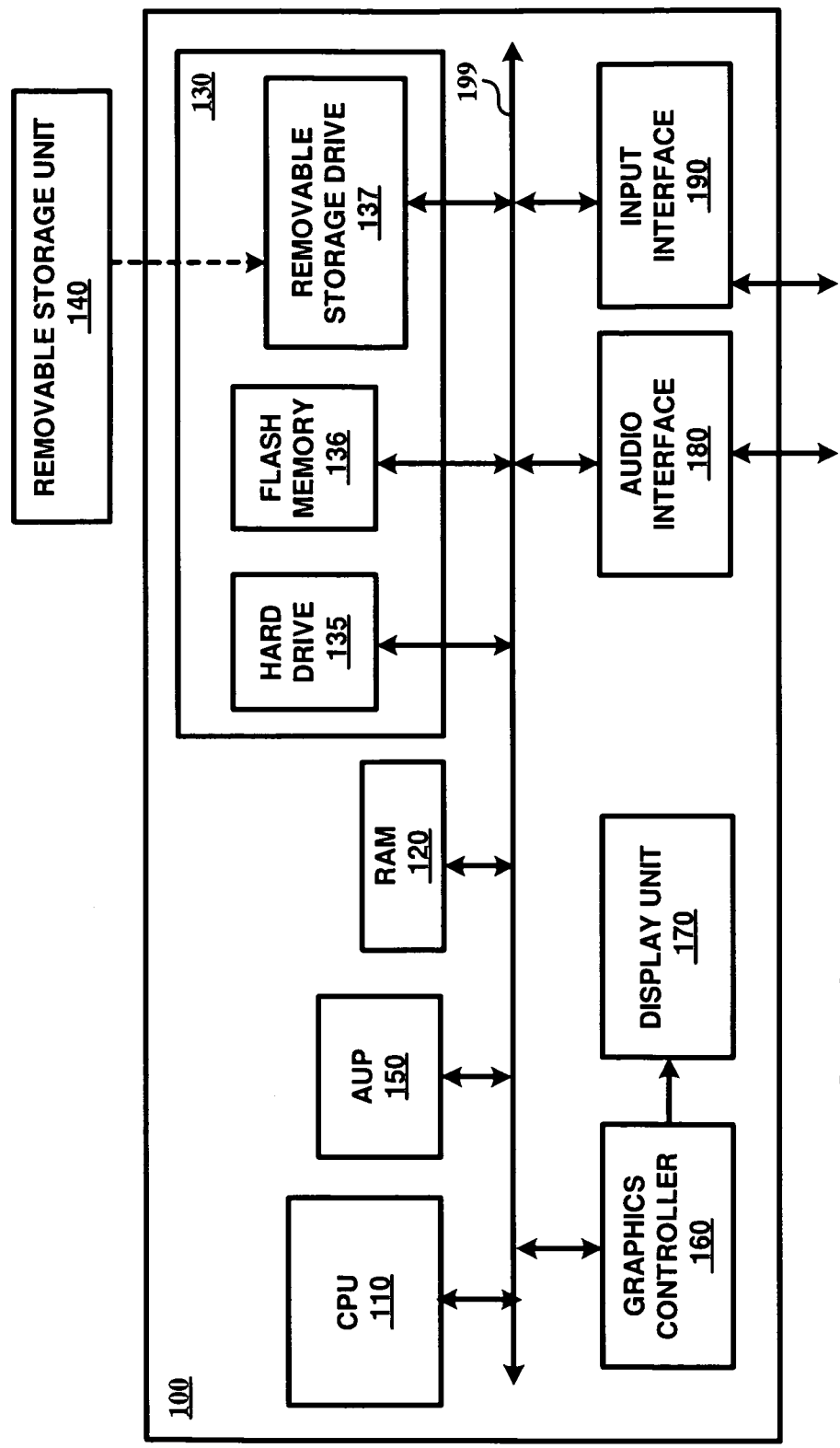
FIG. 1 is a block diagram illustrating the details of an example device in which several aspects of the present invention can be implemented.

FIG. 1 is a block diagram of an example device in which several aspects of the present invention can be implemented. Digital processing system 100 may contain one or more processors such as a central processing unit (CPU) 110, random access memory (RAM) 120, secondary storage 130, Auxiliary processor (AUP) 150, graphics controller 160, display unit 170, audio interface 180, and input interface 190. All the components except display unit 170 may communicate with each other over communication path 199, which may contain several buses as is well known in the relevant arts. The components of FIG. 1 are described below in further detail.

RAM 120 may provide various instructions executed by CPU 110 and/or AUP 150 to cause several features of the present invention to be operative. The instructions may be received first from secondary storage 130 prior to being executed by CPU 110 and AUP 150. RAM 120 may also buffer the data retrieved from the secondary storage as well as parsed data provided by CPU 110 before being decoded. The decoded data may also be stored in RAM 120 prior to being used in decoded form (e.g., being reproduced as video, audio, etc.)

CPU 110 represents the core processor designed for performing complex operations (e.g., implementing drivers, operating system, etc.). CPU 110 is assumed to be a high power consuming device compared to AUP 150. AUP 150 is designed for specific tasks (i.e., decoding in the illustrative examples below). However, portions of decoding can be implemented in other components (e.g., CPU 110) as well, depending on the specific environment. Both AUP 150 and CPU 110 may be designed to be shut off when not required, and thus it may be desirable to reduce the operation of CPU 110 when such is possible, to reduce power consumption.

For purposes of illustration, it is assumed that CPU 110 retrieves encoded content from secondary storage 130, parses the data, and buffers the required data in RAM 120. It is further assumed that the decoder is implemented by execution of appropriate instructions by AUP 150. The features of the invention are illustrated in such a context. However, it should be appreciated that alternative embodiments can be implemented with the CPU implemented functions in one process and the decoder function as another process (both executing on the same processor), without departing from the scope and spirit of several aspects of the present invention.

Graphics controller 160 generates display signals (e.g., in RGB format) to display unit 170 based on data/instructions received from CPU 110. Display unit 170 contains a display screen to display the images defined by the decoded data. Assuming that the content processed represents a movie, the images of the movie may be displayed on display unit 170.

Input interface 190 may correspond to a keyboard and a pointing device (e.g., touch-pad, mouse) and may be used to provide inputs. Some of the inputs may be provided on a display screen implemented as a touch screen and thus the input interface may be partially integrated into graphics controller 160.

Audio interface 180 generates audible signals (e.g., by interfacing with a speaker, not shown) from the digital data received from CPU 110. The audible signals may be part of the movie sought to be reproduced based on the encoded data stored on the secondary storage.

Secondary storage 130 may contain hard drive 135, flash memory 136, and removable storage drive 137. Secondary storage 130 may store the data (e.g., the encoded data) and software instructions (either for CPU 110 or AUP 150), which enable digital processing system 100 to provide several features in accordance with the present invention.

Some or all of the data and instructions may be provided on removable storage unit 140, and the data and instructions may be read and provided by removable storage drive 137 to CPU 110. Floppy drive, magnetic tape drive, CD-ROM drive, DVD Drive, Flash memory, removable memory chip (PCMCIA Card, EPROM) are examples of such removable storage drive 137.

Removable storage unit 140 may be implemented using medium and storage format compatible with removable storage drive 137 such that removable storage drive 137 can read the data and instructions. Thus, removable storage unit 140 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 140 or hard disk installed in hard drive 135. These computer program products are means for providing software to digital processing system 100. CPU 110 and AUP 150 may retrieve the respective software instructions, and execute the instructions to provide various features of the present invention described above. Alternatively, AUP 150 may be implemented as an application specific integrated circuit (ASIC) to decode the digital streams provided by CPU 110.

Various aspects of the present invention provide for decoding with reduced power consumption, as described below in further detail.

3. General Reproduction of the Content

FIG. 2A is a block diagram illustrating the manner in which content is reproduced in one embodiment. The diagram is described with respect to a data stream shown in FIG. 4 for illustration. The content is assumed to represent a movie and the diagram is described with combined reference to FIG. 1. Thus, the blocks of FIG. 2A are shown as being implemented in (or based on execution in) the respective processing components of FIG. 1.

Figure 4:
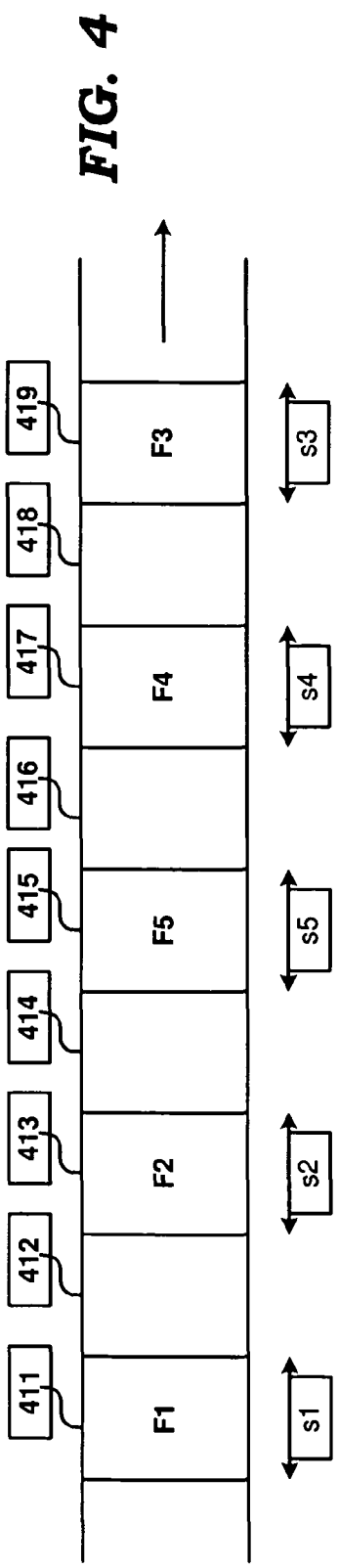
FIG. 4 is a diagram illustrating the manner in which frame of an encoded content may be stored in non-contiguous areas of a secondary storage in an embodiment.

With respect to FIG. 4, a sequence of frames F1-F5 (in that order representing a digital stream) of respective sizes S1-S5 are shown stored in a secondary storage. The sequence of frames represents one data stream (e.g., that representing audio or video). In an embodiment, each frame represents a logical unit of data that is required by the application (e.g., content player 230), though a frame can correspond to any logical data unit sent to the application. Further, though shown at non-contiguously, the frames may be in contiguous areas as well.

The frames are shown stored in the sequence F1, F2, F5, F4 and F3 (a storage order) in respective areas 411, 413, 415, 417, and 419. The encoded content is assumed to be stored in secondary storage 130. The encoded content may have multiple data streams, together representing a movie, as briefly noted above in the background section. The intermediate areas 412, 414, 416 and 418 may be used to store the data stream corresponding these data streams. Thus, the areas 411-419 together represent a track of data on the secondary storage. However, in case of secondary storage implemented using Nand flash/SD cards, areas 411-419 may represent the memory locations in the corresponding address space.

Parser 220 retrieves each of the data streams (encoded data 210) from secondary storage 130, selects the data streams of interest (e.g., discards the data streams corresponding to audio channels of languages not of interest), and provides the frames of each data stream to decoder 240.

Decoder 240 decodes the data in the sequence of frames to generate the decoded content. Thus, decoder 240 may decode each data stream and generate the corresponding decoded data for each data stream.

Content player 230 represents a user application, which processes the decoded content to reproduce the content. Thus, a movie may be played based on the video and audio streams recovered by the decoding operation. The corresponding images are displayed on display unit 170 and audible signals generated using audio interface 180. In general, the specific segments of different streams are synchronized and played to provide a coherent content (audio and text corresponding to video images displayed). RAM 120 may be used by decoder 240 to provide the decoded data to content player 230.

It should be appreciated that the general approach of FIG. 2A can be implemented using various approaches. An aspect of the present invention provides an approach which utilizes power optimally. The features of the invention will be clearer in comparison with prior art approaches. Accordingly, such prior art approaches are described below first.

4. Prior Approaches

It is first helpful to appreciate that there are two transfers of data prior to decoding—(1) between the secondary storage and the parser; and (2) from the parser to the decoder. The manner in which prior approaches addressed both these transfers is described below. Merely for ease of understanding, the prior approaches are described with respect to FIG. 1.

With respect to (1) above, a parser accesses the same data multiple times, with each time targeted for retrieving the next frame in sequence. Thus, since the frames are stored out of sequence, the data corresponding to F5 and F4 may be read and not used, while searching for F3. Once F3 is located, the parser may again retrieve F5 and F4, while searching for F4. Once F4 is located, the parser may again retrieve F5. The parser then sends the frames in the desired sequence F1-F5, with each frame potentially being sent soon after retrieval.

From the above, it may be appreciated that the secondary storage is accessed potentially many times while searching for a next frame.

Another prior approach overcomes the above noted disadvantage by using a large buffer in RAM 120 and reading the entire track of data once and storing the same in the buffer. The data in the buffer is then examined for identifying the frames in sequence. The frames thus identified are then transferred in that sequence to the decoder. Thus, the data is retrieved only once from the secondary storage, reducing the number of accesses (thereby reducing power consumption).

The manner in which the sequence of frames are transferred to the decoder (AUP 150) is illustrated with respect to FIG. 2B.

Figure 6A:
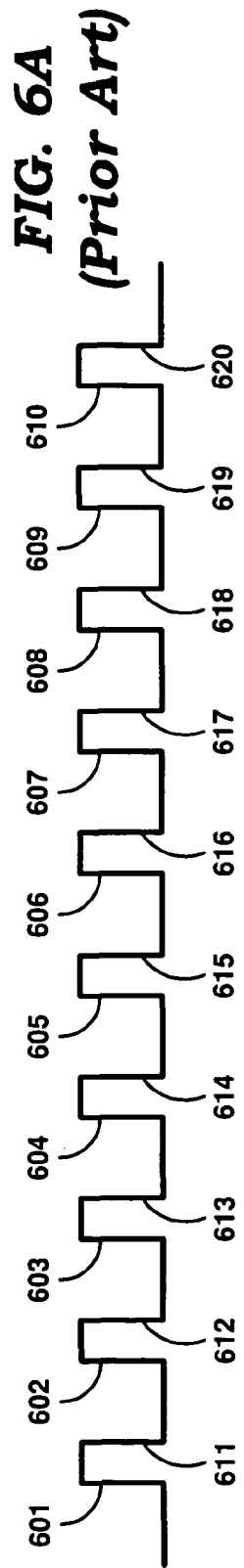
FIG. 6A is a timing diagram illustrating the manner in which data is decoded in a prior approach.

FIGS. 2B, 2C and 6A together illustrate the manner in which a sequence of frames are transferred to decoder 240 in a prior approach. FIG. 2C depicts the usage of the memory space 290 in RAM 120. Thus, sub-space (temporary storage) 291 is used to store the sequence of data retrieved from the secondary storage. Parser 220 examines the data in sub-space 291 to identify the data corresponding to the sequence of frames. Once identified, the frames are transferred to the decoder (in AUP 150) using ping-pong buffer technique well known in the relevant arts.

Sub-space 292 and 293 respectively represent the two buffers used in the ping-pong approach. Thus, when parser 220 successfully identifies a desired frame of a desired data stream (from the data representing several data streams in sub-space 291), the corresponding data is copied to the empty one of the two ping-pong buffers. Once a buffer is filled, the parser notifies the decoder (e.g., by an appropriate interrupt). Similarly, when the data in a buffer is decoded and no longer needed, the decoder notifies the availability of the buffer to the parser.

The sequences of buffer transfers in both directions are logically depicted in FIG. 2B. Thus, buffers B1-B3 261-263 are shown being sent to AUP 140 and empty buffers 271-273 being returned to the parser/CPU 110. The time lines for such transfers is illustrated with respect to FIG. 6A.

The duration between time points 601 and 611 represents the duration in which CPU 110 is operative performing the parsing and filling the buffers. Thus, there are several durations (e.g., 611-602, 612-603, etc.), in which the processor is not being used for parsing.

One problem with such an approach is that the CPU is interrupted multiple times (e.g., at each of times instances 601-610) corresponding to each frame. Similarly, AUP 150 may be interrupted multiple times (e.g., at each of time instances 611-620) when a ping-pong buffer is filled with data.

As each of such interruptions is often implemented as operating system level primitives (e.g., interrupts), the overhead of the implementation may be substantially high, leading to higher power consumption. An aspect of the present invention overcomes such drawbacks, as described below in further detail with examples.

5. Optimal Decoding

Figure 3:
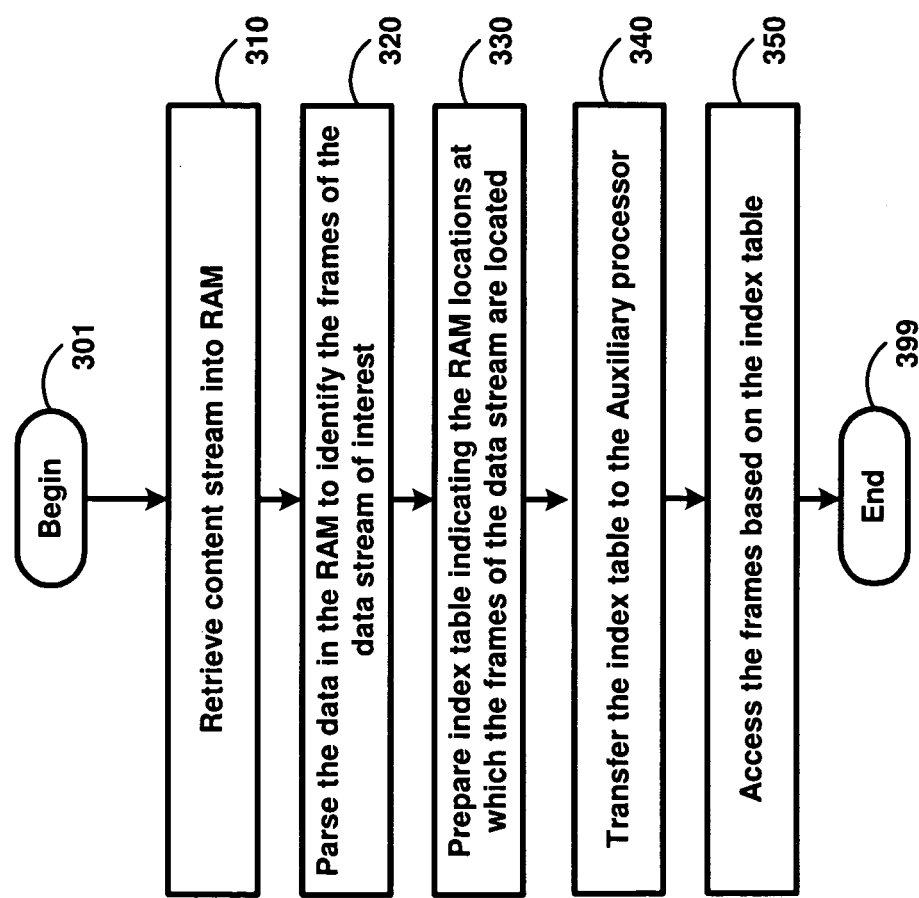
FIG. 3 is a flow chart illustrating the manner in which content is decoded in an embodiment of the present invention.

FIG. 3 is a flowchart illustrating the manner in which data streams are decoded in an embodiment of the present invention. The flowchart is described with respect to FIG. 1, merely for illustration. However, various features can be implemented in other environments. Furthermore, the steps are described in a specific sequence merely for illustration. Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 301, in which control passes immediately to step 310.

In step 310, parser 220 retrieves the content stream into RAM 120. With respect to FIG. 4, it may be appreciated that the data corresponding to all areas 411-419 may be retrieved and stored in RAM 120. The manner in which the data is stored, is represented logically in FIG. 5. Thus, the frames F1, F2, F5, F4 and F3, retrieved in that sequence ("retrieval order") from the track of FIG. 4, are shown stored in sequential memory locations in RAM 120.

In step 320, parser 220 parses the data in RAM 120 to identify the frames of the data stream of interest. Thus, frames F1, F2, F5, F4 and F3 are identified as the frames of interest. It should be appreciated that each frame may be potentially identified as being of interest as the data in the memory is examined.

Figure 7:
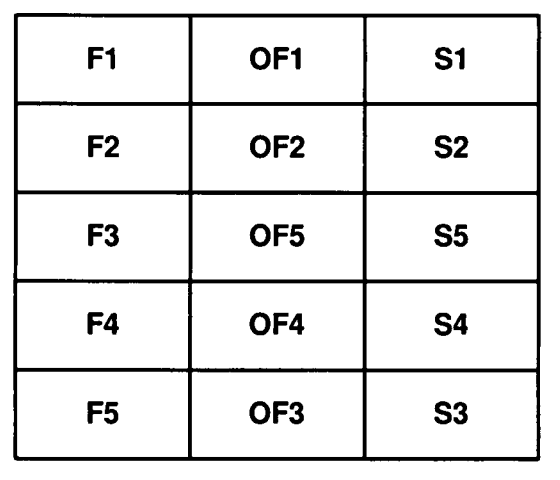

In step 330, parser 220 prepares an index table identifying the locations at which each of the frames is located. Assuming that the locations storing each frame are sought to be identified in relation to a base address, the corresponding index table is depicted in FIG. 7. Thus, the size of each frame and the start address (offset address, OF) of the frame relative to a base address is shown in the table. Thus, if the base address is 10, and a start address for a frame is 19, the offset is computed to equal 9.

It may be observed that parser 220 is shown to have reordered the information in the offset table of FIG. 7. However, the information may be provided in the order of retrieval of the frames and the decoder may be designed to reorder the processing of the frames. Similarly, other data structures (e.g., linked lists) can be used to provide the index information for the frames available in RAM 120.

In step 340, the index table is transferred to AUP 150. The transfer may be effected using one of several known approaches. For example, the table may be stored at pre-specified locations and an interrupt may be provided to signal the availability of the portion of the table constructed using steps 320/330. Ping-pong buffers may be used to provide portions of the table as the information is constructed using steps 320/330. In general, each portion may contain information related to multiple portions as depicted in FIG. 7.

Furthermore, the information may include any additional information required for decoding and further processing of each of the frames. For example, the time stamps may be embedded in additional columns provided in reference to FIG. 7.

In addition, in an embodiment in which the same physical location of RAM 120 is addressed in with different addresses in CPU 110 and AUP 150, the CPU 110 may provide the base address as computed for AUP 150. Alternatively, the absolute addresses (as would be computed within AUP 150) at which the information for each frame would start may be indicated in the index table.

Figure 5:
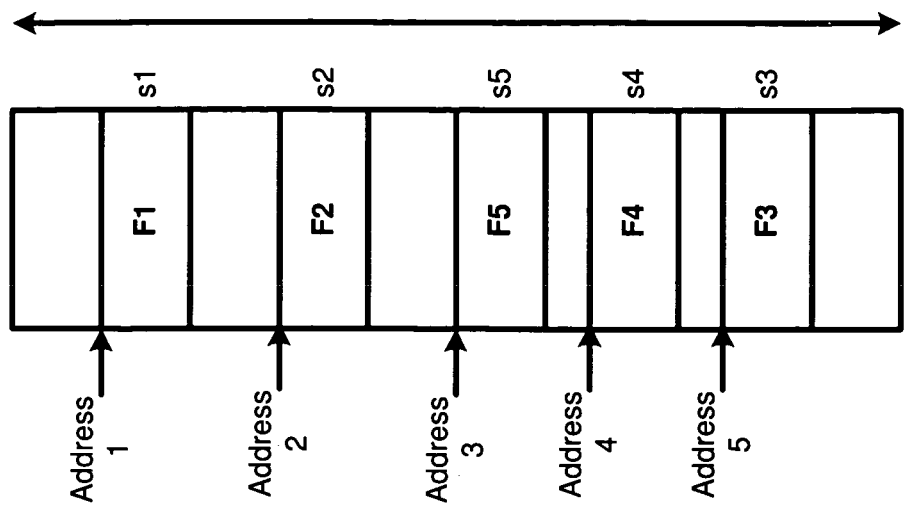
FIG. 5 is a diagram illustrating the manner in which a data stream of a content is retrieved and stored prior to parsing in an embodiment of the present invention.

In step 350, decoder 240 accesses the frames based on the index table. Thus, when frame F3 is sought to be accessed, the third row corresponding to frame F3 in FIG. 7 is first retrieved, the start location at which the data corresponding to frame F3 is identified based on the retrieved row, and the data for frame F3 is then retrieved based on offset OF5 from the memory represented in FIG. 5. Thus, the address ADDRESS5 of FIG. 5 is computed as the sum of the base address and offset OF5. A number of data units equaling the size S3 may be retrieved (from RAM 120) starting from the computed address, and processed (by content player 230). The flow chart ends in step 399.

While the flowchart of FIG. 3 is described with respect to processing of a single data stream, it should be appreciated that the features can be extended to process multiple data streams (of interest) contained in the content stream. In such a situation, the parser may provide a separate index table corresponding to each data stream and thus the index tables may be constructed in a single pass while examining the content stream stored in RAM 120. Thus, one index table may be generated for the data stream representing a sequence of images and another data stream is generated for the data stream representing corresponding audio signal.

Thus, the approach of FIG. 3 operates to retrieve the frames of interest and provide the same to decoder for further processing. The approach may have several advantages in comparison to the prior approaches noted above, as described below.

6. Comparison with Prior Approaches

Figure 6B:
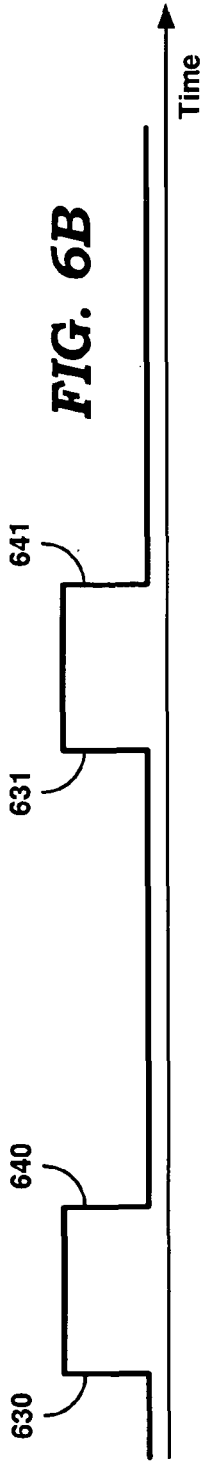
FIG. 6B is a timing diagram illustrating the power reduction compared to a prior approach, in an embodiment.

FIG. 6B illustrates the reduced interaction between CPU 110 and AUP 150 (thereby leading to reduced power consumption) due to the approach of FIG. 3. The duration between 630 and 640 represents the time in which the steps 310-330 are performed. Thus, the index table may be transferred (or made available) to AUP 150 at time instances 640 and 641.

As may be readily appreciated, the content stream is retrieved in contiguous duration and thus the secondary storage (and corresponding drive electronics) may be potentially shut off in duration 640-631 as well as a portion of 630-640, which corresponds to the parsing alone duration. As the parsing is a computationally intensive task, the duration within 630-640 may also be substantial for low end devices (typically in consumer electronics space). Power consumption is reduced as a result.

In addition, the number of interactions between CPU 110 and AUP 150 are also reduced due to the use of the index table since the index table contains the information related to several frames, potentially which are non-contiguous. Thus, the interrupt type of transactions are reduced on CPU 110 and AUP 150, thereby providing an option to shutoff either processor when other tasks do not require them to be operational. Accordingly, CPU 110 can be shutoff in duration 640-631, thereby reducing the power consumption.

Thus, several aspects of the present invention provide for optimal power consumption while decoding content streams.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A device comprising:
a secondary storage to store a data stream containing a sequence of frames in an encoded format;
a random access memory (RAM);
a first processor to retrieve said sequence of frames and to store said sequence of frames in said RAM, said first processor operable to form index information indicating respective locations in said RAM at which each of said sequence of frames is stored; and
a second processor operable to receive said index information, retrieve said sequence of frames based on said index information, and to decode said sequence of frames in said RAM to form said sequence of frames in a decoded format,
wherein said secondary storage, said first processor and/or said second processor is operable to be placed into a low power consumption mode when inactive with respect to processing said content stream and after said index information is formed.

2. The device of claim 1, wherein said first processor is a central processing unit (CPU) and said second processor is an auxiliary processor.

3. The device of claim 1, wherein said sequence of frames in a first order represent said data stream, said sequence of frames being stored on said secondary storage in non-contiguous areas in a second order not identical to said first order, wherein said first processor is operable to:
retrieve said sequence of frames from said secondary storage in said second order prior to storing in said RAM; and
form said index information by examining said sequence of frames stored in said RAM.

4. The device of claim 3, wherein said index information is provided in the form of an index table containing a plurality of entries, with each entry corresponding to a corresponding one of said sequence of frames, each entry indicating a size of the corresponding frame and a location in said RAM starting from which the frame is stored.

5. The device of claim 4, wherein said first processor stores said index information in said RAM and sends an interrupt thereafter to said second processor.

6. The device of claim 5, wherein said data stream is contained in a content stream comprising a plurality of data streams in said encoded format,
wherein said secondary storage stores the data corresponding to each of said plurality of data streams in corresponding non-contiguous areas on said secondary storage,
said first processor being operable to form a corresponding index table for each of said plurality of data streams and to provide the index tables to said second processor, said second processor decoding each of said plurality of data streams based on the corresponding received index table.

7. The device of claim 6, wherein said content stream represents a multi-media content, wherein said plurality of data streams contain a first data stream representing video images and a second data stream representing an audio signal, said first processor playing said multi-media content.

8. A method of processing a content stream stored on a secondary storage, said method comprising:
retrieving said content stream to a random access memory (RAM);

examining the data stored in said RAM to determine a sequence of frames related to a data stream contained in said content stream;

forming index information indicating locations of said RAM where each of said sequence of frames is stored;

providing said index information to a decoder, wherein said decoder decodes said sequence of frames by identifying said sequence of frames in said RAM based on said index information ; and placing said secondary storage and/or said decoder to a lower consumption mode after said forming and when said second storage and/or decoder is inactive with respect to said content stream.

9. The method of claim 8, wherein said content stream represents a multi-media content, said method further comprising:

receiving said sequence of frames in a decoded form; and playing said multi-media content based on said decoded form.

10. The method of claim 9, wherein said forming comprising:

creating a table containing a plurality of entries, with each entry corresponding to a corresponding one of said sequence of frames, each entry indicating a size of the corresponding frame and a location in said RAM starting from which the frame is stored.

11. The method of claim 10, wherein said decoder is implemented in a second processor, said method further comprising sending an interrupt thereafter to said second processor after said forming.

12. The method of claim 11, wherein said data stream is contained in said content stream comprising a plurality of data streams in an encoded format, wherein said secondary storage stores the data corresponding to each of said plurality of data streams in corresponding non-contiguous areas on said secondary storage, a first processor being operable to form a corresponding index table for each of said plurality of data streams and to provide the index tables to said second processor, said second processor decoding each of said plurality of data streams based on the corresponding received index table, wherein said first processor is operable to be placed in a low power consumption mode when inactive with respect to said data stream.

13. The method of claim 12, wherein said content stream represents a multi-media content, wherein said plurality of data streams contain a first data stream representing video images and a second data stream representing an audio signal, said first processor playing said multi-media content.

14. The method of claim 8, wherein said sequence of frames in a first order represent said data stream, said sequence of frames being stored on said secondary storage in non-contiguous areas in a second order not identical to said first order, said method further comprising:

retrieving said sequence of frames from said secondary storage in said second order prior to storing in said RAM, wherein said forming forms said index information by examining said sequence of frames stored in said RAM.

15. A non-transitory machine-readable storage medium carrying one or more sequences of instructions for causing a device to process a content stream, wherein execution of said one or more sequences of instructions by one or more processors contained in a digital processing system causes said digital processing system to perform the actions of:

retrieving said content stream into a random access memory (RAM);

examining the data stored in said RAM to determine a sequence of frames related to a data stream contained in said content stream;

forming index information indicating locations of said RAM where each of said sequence of frames is stored;

providing said index information to a decoder, wherein said decoder decodes said sequence of frames by identifying said sequence of frames in said RAM based on said index information, placing said secondary storage and/or said decoder to a low power consumption mode after said forming and when said second storage and/or decoder is inactive with respect to processing said content stream.

16. The non-transitory machine-readable storage medium of claim 15, wherein said sequence of frames in a first order represent said data stream, said sequence of frames being stored on a secondary storage in non-contiguous areas in a second order not identical to said first order, further comprising:

retrieving said sequence of frames from said secondary storage in said second order prior to storing in said RAM, wherein said forming forms said index information by examining said sequence of frames stored in said RAM.

17. The non-transitory machine-readable storage medium of claim 16, wherein said forming comprising:

creating a table containing a plurality of entries, with each entry corresponding to a corresponding one of said sequence of frames, each entry indicating a size of the corresponding frame and a location in said RAM starting from which the frame is stored.

18. The non-transitory machine-readable storage medium of claim 17, wherin said decoder is implemented in a second processor, said action further comprising sending an interrupt thereafter to said second processor after said forming.

19. The non-transitory machine-readable storage medium of claim 18, wherein said data stream is contained in said content stream comprising a plurality of data streams in an encoded format, wherein said secondary storage stores the data corresponding to each of said plurality of data streams in corresponding non-contiguous areas on said secondary storage, a first processor being operable to form a corresponding index table for each of said plurality of data streams and to provide the index tables to said second processor, said second processor decoding each of said plurality of data streams based on the corresponding received index table, wherein said first processor is operable to shut off to reduce power consumption when inactive with respect to said data stream.

20. The non-transitory machine-readable storage medium of claim 19, wherein said content stream represents a multi-media content, wherein said plurality of data streams contain a first data stream representing video images and a second data stream representing an audio signal, said first processor playing said multi-media content.

* * * * *